United States Patent
Whateley

[11] 3,769,857
[45] Nov. 6, 1973

[54] CHANGE-SPEED GEARING
[75] Inventor: Eric Albert Whateley, Huddersfield, England
[73] Assignee: David Brown Industries Limited, Huddersfield, England
[22] Filed: Sept. 16, 1971
[21] Appl. No.: 181,156

[30] Foreign Application Priority Data
Sept. 23, 1970 Great Britain.................. 45,185/70

[52] U.S. Cl......................... 74/730, 74/330, 74/359
[51] Int. Cl..................... F16h 47/00; F16h 3/08
[58] Field of Search.................. 74/730, 359, 330

[56] References Cited
UNITED STATES PATENTS

| | | | |
|---|---|---|---|
| 2,206,409 | 7/1940 | Kummich.............................. | 74/359 |
| 2,461,027 | 2/1949 | Bodmer................................ | 74/359 |
| 2,690,680 | 10/1954 | Maier et al. ....................... | 74/359 X |
| 2,991,661 | 7/1961 | Raubausek......................... | 74/359 X |

Primary Examiner—Arthur T. McKeon
Attorney—Norris & Bateman

[57] ABSTRACT

A semi-automatic torque transmitting gearbox for a vehicle comprises an input member, first and second shafts co-axial with that member, a layshaft, gearing interposed between the input member and the layshaft and including freewheel means for permitting the layshaft to rotate faster than it can be driven by the input member through that gearing, gearing interposed between the first co-axial shaft and the layshaft which is of lower ratio than the first mentioned gearing, gearing interposed between the second co-axial shaft and the layshaft and including a disengagable clutch for positively connecting those shafts together via that gearing, a disengagable clutch for positively connecting together the first and second co-axial shafts, freewheel means for permitting the input member to rotate faster than the first co-axial shaft, and a disengagable clutch for positively connecting together the input member and the first co-axial shaft.

6 Claims, 2 Drawing Figures

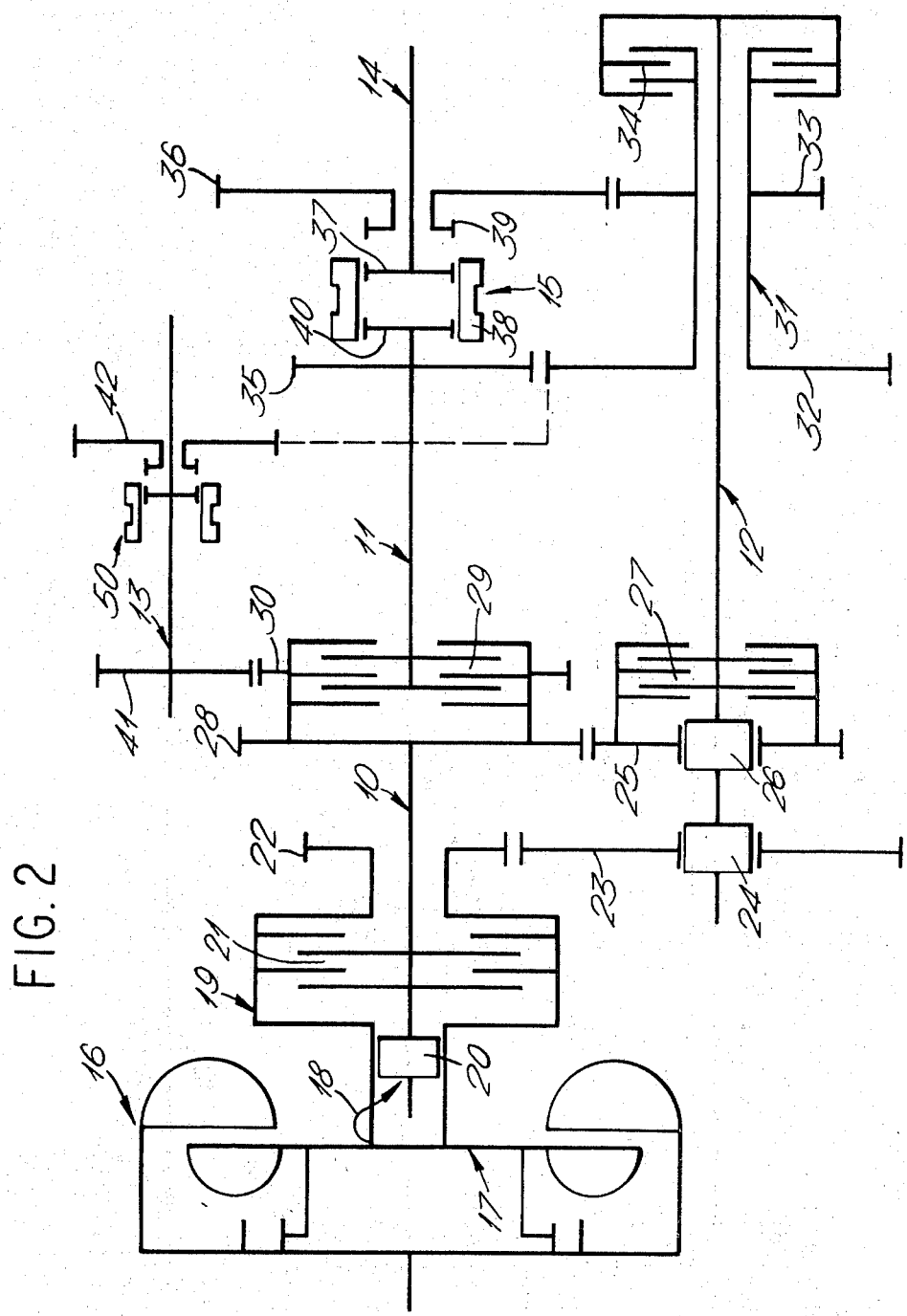

CHANGE-SPEED GEARING

The invention relates to change-speed gearboxes and more particularly to vehicle torque transmission gearboxes.

In order to provide semi-automatic torque transmission in vehicles, epicyclic gearboxes employing clutches and band brakes have been used. However, epicyclic gearboxes have the disadvantages that a large number of expensive components are required and that the overall length of the gearbox inherently increases as the number of gear ratios available increases. Thus vehicles requiring a large number of semi-automatically selected gear ratios, have needed an epicyclic gearbox of ungainly length.

The object of the invention is to provide a gearbox suitable for semi-automatic operation and having a large number of gear ratios which is considerably shorter in length than an epicyclic gearbox having the same number of gear ratios, and to use a large number of the standard components of a conventional manually operable layshaft gearbox.

According to the invention, a gearbox comprises an input member, first and second shafts co-axial with said member, a layshaft, gearing interposed between the input member and the layshaft and including freewheel means for permitting the layshaft to rotate faster than it can be driven by the input member through said gearing, gearing interposed between the first co-axial shaft and the layshaft which is of lower ratio than the first mentioned gearing, gearing interposed between the second co-axial shaft and the layshaft and including a disengagable clutch for positively connecting said shafts together via said gearing, a disengagable clutch for positively connecting together the first and second co-axial shafts, freewheel means for permitting the input member to rotate faster than the first co-axial shaft, and a disengagable clutch for positively connecting together said member and said shaft.

Several embodiments of the invention will now be described, by way of example only, with reference to the accompanying drawings which show diagrammatic arrangements of the components of gearboxes suitable for semi-automatic operation.

In the drawings

FIG. 2 illustrates a related further embodiment which differs from the first embodiment in the addition of a freewheel device and multiple plate clutch at the layshaft as will appear.

Figure 1:
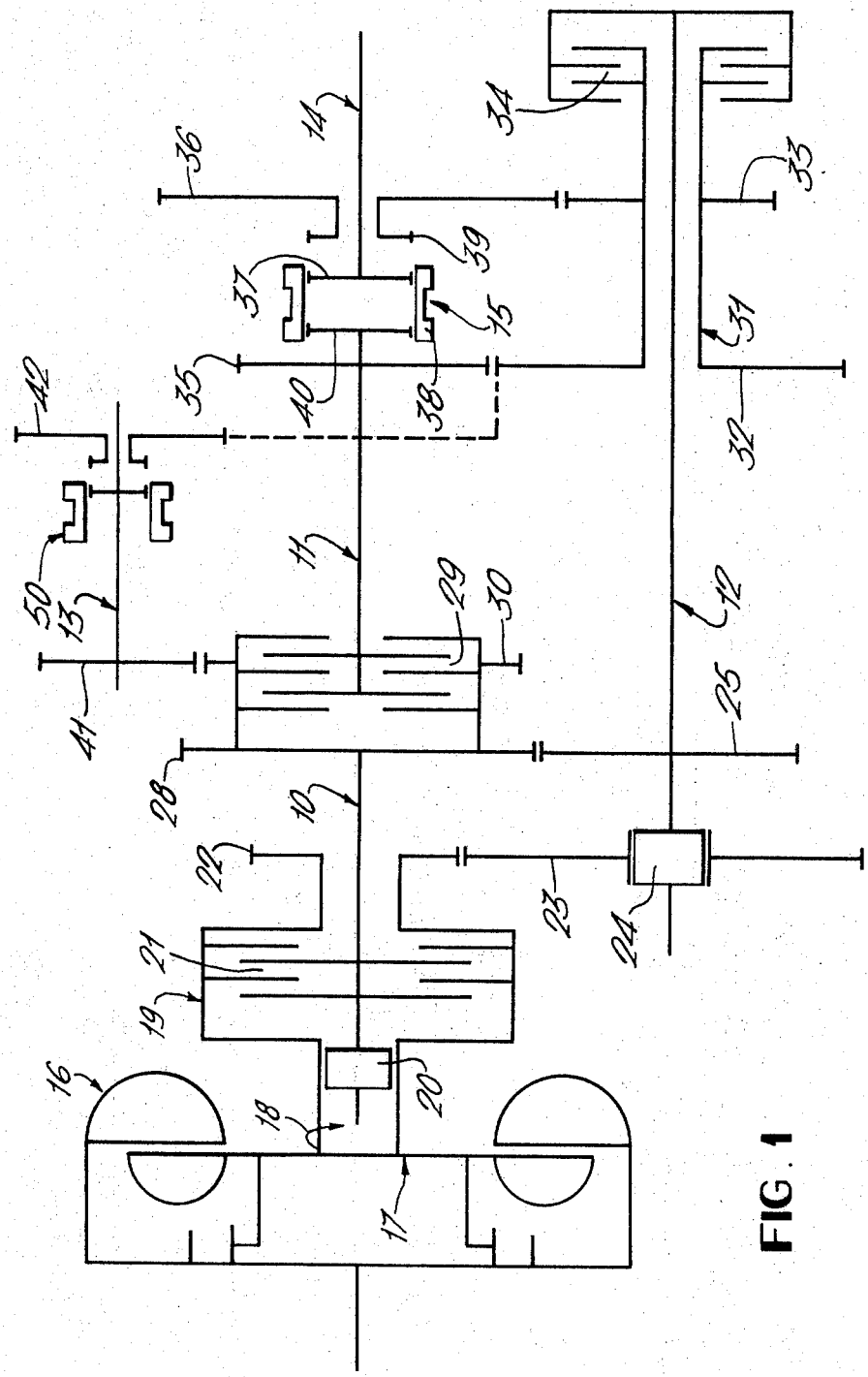
FIG. 1 illustrates one embodiment.

Referring now to FIG. 1 of said drawings, a gearbox is basically a four speed and reverse gearbox having an input sleeve 19, first and second shafts 10 and 11 respectively which are co-axial with said sleeve, a layshaft 12 and a reverse shaft 13, in combination with a third shaft 14, co-axial with the input sleeve 19 and constituting the output shaft, and with high and low range gearing, hereinafter described, controlled by a synchromesh dog-toothed clutch 15 for doubling the number of forward speeds. Torque is supplied to the gearbox via a fluid coupling 16 having an output member 17 which is driven in the direction indicated by the arrow 18, said direction hereinafter being referred to as clockwise. Said output member is drivably connected to the input sleeve 19 which contains a freewheel device 20 and a multi-plate clutch 21 and is provided with a pinion 22. The freewheel device 20 has conventional inner and outer portions and operates to apply engine braking to the vehicle when the transmission is overrunning, that is to say when there is a reversal of torque in the first co-axial shaft 10. The outer portion of the freewheel device 20 is secured to the input sleeve 19, and the inner portion thereof is secured to the first co-axial shaft 10. The input sleeve 19 and the first co-axial shaft 10 both rotate in a clockwise direction. In certain gear ratios in which the clutch 21 is disengaged, the input sleeve 19 rotates faster than the first co-axial shaft 10 when the engine is applying torque to the vehicle's driving wheels, and the freewheel device overruns. However, when the vehicle is proceeding downhill and the engine is running light, the vehicle's driving wheels try to rotate the first co-axial shaft 10 faster than the input sleeve 19. In this condition the freewheel device 20 locks the input sleeve 19 and the first co-axial shaft 10 together and braking of the vehicle's driving wheels by the engine takes place. The clutch 21 has its inner plates drivably connected to the first co-axial shaft 10 and its outer plates drivably connected to the input sleeve 19. Engagement of the clutch 21 causes the first co-axial shaft 10 to rotate in a clockwise direction, together with the input sleeve 19. When the clutch 21 is engaged, the freewheel device 20 becomes inoperative. The pinion 22 meshes with a gearwheel 23 mounted on the layshaft 12 by means of a freewheel device 24 which permits the layshaft to overrun said gearwheel but not vice versa. The first co-axial shaft 10 and the layshaft 12 are interconnected by a pair of gears comprising a pinion 25 rigidly secured on the layshaft 12 and a gearwheel 28 which is rigidly secured to the first co-axial shaft 10 and is capable of being clutched to the second co-axial shaft 11 by a multi-plate clutch 29. The outer casing of the clutch 29 and a gearwheel 30 are secured co-axially to the gearwheel 28. A sleeve 31 which surrounds one end of the layshaft 12 has rigidly secured on it a gearwheel 32 and a pinion 33 and can be coupled to the layshaft by means of a multi-plate clutch 34. The gearwheel 32 meshes with a pinion 35 which is rigidly secured to the second co-axial shaft 11, and the pinion 33 meshes with a gearwheel 36 rotatably mounted on the third co-axial shaft 14. The synchromesh dog-toothed clutch 15 comprises a hub portion 37 rigidly secured to the inner end of the third co-axial shaft 14 and a sleeve portion 38 slidably mounted on splines on said hub portion, the sleeve portion being engagable either with dog-teeth 39 formed on the gearwheel 36 or with dog-teeth 40 formed on that end of the second co-axial shaft 11 adjacent the inner end of the third co-axial shaft 14 in order to provide alternative high and low ranges of output speeds. The low range gearing is engaged when the gearwheel 36 is clutched to the third co-axial shaft 14 and the high range gearing is engaged when the second co-axial shaft 11 is clutched to the third co-axial shaft 14. A pinion 41 rigidly secured to one end of the reverse shaft 13 is in constant mesh with the gearwheel 30. The reverse shaft 13 has rotatably mounted on it a pinion 42 which is in constant mesh with the gearwheel 32 and which is drivably connectible to the reverse shaft by means of a dog-toothed clutch 50.

All the clutches are actuated by a fluid power system (not shown) including selector valve means which enable any one of eight forward and one reverse gear ratios to be engaged by actuation of the appropriate clutch or clutches. Said one reverse gear ratio is that available when the low range gearing is engaged, no supply of fluid power being provided for selecting the reverse gear ratio potentially available when the high range gearing is engaged. The selector valve means and the method of operation thereof may be of any suitable kind.

In operation, the clutch 15 is in the low range position when neutral, reverse, first, second, third or fourth gear is engaged and is in the high range position when fifth, sixth, seventh or eighth gear is engaged. When the selector valve means are placed in the neutral position all the multi-plate clutches are disengaged. On the selection of first gear, the multi-plate clutch 29 is engaged and torque is transmitted from he vehicle's engine to the third co-axial shaft 14 via the fluid coupling 16, the input sleeve 19, the gears 22 and 23, the freewheel device 24, the layshaft 12, the gears 25 and 28, the clutch 29, the second co-axial shaft 11, the gears 35 and 32, the sleeve 31, the gears 33 and 36 and the dog-toothed clutch 15. On the selection of second gear, the multi-plate clutch 34 is engaged and torque is transmitted from the vehicle's engine to the third co-axial shaft 14 via the fluid coupling 16, the input sleeve 19, the gears 22 and 23, the freewheel device 24, the layshaft 12, the clutch 34, the sleeve 31, gears 33 and 36 and the dog-toothed clutch 15. On the selection of third gear, the multi-plate clutch 34 is disengaged, the clutches 21 and 29 are engaged and torque is transmitted from the vehicle's engine to the third co-axial shaft 14 via the fluid coupling 16, the input sleeve 19, the clutch 21, the first co-axial shaft 10, the clutch 29, the second co-axial shaft 11, the gears 35 and 32, the sleeve 31, the gears 33 and 36 and the dog-toothed clutch 15. On the selection of fourth gear, the clutch 21 remains engaged, the clutch 29 is disengaged, and the clutch 34 is engaged. Torque is then transmitted from the vehicle's engine to the third co-axial shaft 14 via the fluid coupling 16, the input sleeve 19, the clutch 21, the first co-axial shaft 10, the gears 28 and 25, the layshaft 12, the clutch 34, the sleeve 31, the gears 33 and 36 and the dog-toothed clutch 15. On the selection of fifth gear all the multi-plate clutches are disengaged, the sleeve portion 38 of the synchromesh dog-toothed clutch 15 is moved from engagement with the dog-teeth 39 formed on the gearwheel 36 into engagement with the dog-teeth 40 formed on the second co-axial shaft 11 so as to couple the third co-axial shaft 14 to the second co-axial shaft, and the multi-plate clutch 29 is then engaged. Torque from the engine then follows the same path to the second co-axial shaft 11 as it does when first gear is engaged, but as the shafts 11 and 14 are coupled together the reduction through the gears 35, 32, 33 and 36 is not used. On the selection of sixth gear, the torque path to the sleeve 31 is the same as when second gear is engaged, but torque is transmitted from the sleeve 31 to the third co-axial shaft 14 via the gears 32 and 35. On the selection of seventh gear, the torque path to the second co-axial shaft 11 is the same as when third gear is engaged, but as the shafts 11 and 14 are coupled together the reduction through the gears 35, 32, 33 and 36 is not used. On the selection of eighth gear, the torque path to the sleeve 31 is the same as when fourth gear is engaged, but torque is transmitted from the sleeve 31 to the third co-axial shaft 14 via the gears 32 and 35. On the selection of reverse gear all the multi-plate clutches are disengaged, the third co-axial shaft 14 is coupled to the gear 36 by the dog-toothed clutch 15 and the gear 42 is coupled to the reverse shaft 13 by the dog-toothed clutch 50, and torque is transmitted from the vehicle's engine to the third co-axial shaft 14 via the fluid coupling 16, the input sleeve 19, the gears 22 and 23, the freewheel device 24, the layshaft 12, the gears 25 and 28, the gears 30 and 41, the reverse shaft 13, the dog-toothed clutch 50, the gears 42 and 32, the sleeve 31 and the gears 33 and 36.

The freewheel device 20 enables engine braking to take place on overrun, that is to say when there is a reversal of torque in the first co-axial shaft 10, for example when the vehicle is proceeding downhill and drive is transmitted from the driving wheels to the first co-axial shaft 10. The freewheel device 20 locks the input sleeve 19 and the first co-axial shaft 10 together when overrun occurs in first, second, fifth or sixth gear and engine braking is obtained due to the first co-axial shaft 10 being coupled to the second co-axial shaft 11 by the clutch 29 and the second co-axial shaft being positively connected to the third co-axial shaft 14. Engine braking is obtained in third and seventh gears through the same torque paths as in first, second, fifth and sixth gears without the use of the freewheel device 20 due to the engagement of the clutch 21. Engine braking is obtained in fourth and eighth gears without the use of the freewheel device 20 due to the engagement of the clutch 21 and the positive connection of the first co-axial shaft 10 to the third co-axial shaft 14 by the clutch 34. With this arrangement all gear changes are made while the freewheel devices are overrunning.

Another embodiment of the invention will now be described, by way of example only, with reference to FIG. 2 of the drawing which shows a diagrammatic arrangement of the components of a gearbox similar to that forming said one embodiment and also suitable for semi-automatic operation.

Referring now to FIG. 2 of said drawings, the components of the gearbox therein illustrated differ from those of the gearbox forming said one embodiment only by the provision of an additional freewheel device 26 which permits the pinion 25 to overrun the layshaft 12 but not vice versa and an additional multi-plate clutch 27 by means of which the pinion 25 can be coupled to the layshaft 12. Engagement of the multi-plate clutch 27 renders the freewheel device 26 inoperative. The power paths through the gearboxes forming both embodiments are identical in all gear ratios, and in both embodiments only the multi-plate clutch 29 is operative when first or fifth gear is selected. In the embodiment of FIG. 2 in order to permit the pinion 25 to overrun the layshaft 12 or to couple said pinion to said layshaft in second, third, fourth, sixth, seventh and eighth gear ratios, it is necessary in each of said gear ratios that in addition to the clutch or clutches engaged in said one embodiment one further clutch is engaged. Thus in the embodiment of FIG. 2 when second or sixth gear is selected the clutch 29 is engaged in addition to the clutch 34, and the gear 25 overruns the layshaft 12; when third or seventh gear is selected the clutch 34 is engaged in addition to the clutches 21 and 29, and the gear 25 overruns the layshaft 12; and when fourth or eighth gear is selected the clutch 27 is engaged in addition to the clutches 21 and 34, the pinion 25 thus being coupled to the layshaft 12.

The operation of the embodiment of FIG. 2 also differs from that of the said one embodiment in that the arrangement of the freewheel devices 24 and 26 and of the clutches enables "kick-down" changes to be made into any gear while the gearbox is transmitting power due to the ability of said devices to take up the drive.

In a modification applicable to both embodiments, the components 33, 36, 39, 40, 37, 38 and 14 are omitted and the second co-axial shaft 11 constitutes the output shaft of a four speed and reverse gearbox without associated high and low range gearing.

What we claim is:

1. A gearbox comprising an input member, first and second shafts co-axial with said member, a layshaft, gearing interposed between the input member and the layshaft and including freewheel means for permitting the layshaft to rotate faster than it can be driven by the input member through said gearing, gearing interposed between the first co-axial shaft and the layshaft which is of lower ratio than the first mentioned gearing, gearing interposed between the second co-axial shaft and the layshaft and including a disengagable clutch for positively connecting said shafts together via said gearing, a disengagable clutch for positively connecting together the first and second co-axial shafts, freewheel means for permitting the input member to rotate faster than the first co-axial shaft, and a disengagable clutch for positively connecting together said member and said shaft.

2. A gearbox comprising an input member, first and second shafts co-axial with said member, a layshaft, gearing interposed between the input member and the layshaft and including freewheel means for permitting the layshaft to rotate faster than it can be driven by the input member through said gearing, gearing interposed between the first co-axial shaft and the layshaft and including freewheel means for permitting the first co-axial shaft to rotate faster than it can be driven by the layshaft through said gearing and also including a disengagable clutch for positively connecting said shafts together via said gearing which is of lower ratio than the first mentioned gearing, gearing interposed between the second co-axial shaft and the layshaft and including a disengagable clutch for positively connecting said shafts together via said gearing, a disengagable clutch for positively connecting together the first and second co-axial shafts, freewheel means for permitting the input member to rotate faster than the first co-axial shaft, and a disengagable clutch for positively connecting together said member and said shaft.

3. A gearbox according to claim 1, wherein the input member is drivably connected to the output member of a fluid coupling.

4. A gearbox according to claim 1, wherein the gearing interposed between the second co-axial shaft and the lay-shaft includes a sleeve surrounding the layshaft and carrying the driven half of the associated clutch and a gear forming part of said gearing.

5. A gearbox according to claim 4, comprising a third shaft co-axial with the input member, a further gear on the sleeve having a different pitch circle diameter to the first mentioned gear thereon and meshing with a gear rotatable on the third co-axial shaft, and a clutch for selectively connecting the third co-axial shaft either to the gear thereon or to the second co-axial shaft.

6. A gearbox according to claim 1, having reverse mechanism comprising a reverse shaft; gearing interposed between the first co-axial shaft, the reverse shaft and a gear on the layshaft forming part of the gearing interposed between the second co-axial shaft and the layshaft; and a disengagable clutch in said mechanism.

* * * * *

UNITED STATES PATENT OFFICE
CERTIFICATE OF CORRECTION

Patent No. 3,769,857   Dated   November 6, 1973

Inventor(s)   ERIC ALBERT WHATELEY

It is certified that error appears in the above-identified patent and that said Letters Patent are hereby corrected as shown below:

The Assignee of the above identified patent should read --DAVID BROWN GEAR INDUSTRIES LIMITED--

Signed and sealed this 3rd day of December 1974.

(SEAL)
Attest:

McCOY M. GIBSON JR.
Attesting Officer

C. MARSHALL DANN
Commissioner of Patents